United States Patent [19]

Jones

[11] Patent Number: 5,385,404

[45] Date of Patent: Jan. 31, 1995

[54] TEMPERATURE MEASURING DEVICE

[76] Inventor: Barbara L. Jones, 80 Chisbury Close, Forest Park, Bracknell RG12 3TX, England

[21] Appl. No.: 728,551

[22] Filed: Jul. 11, 1991

[30] Foreign Application Priority Data

Jul. 11, 1990 [GB] United Kingdom ............... 9015268

[51] Int. Cl.$^6$ .................... G01J 5/58; G01K 11/00
[52] U.S. Cl. ..................... 374/161; 374/131; 505/847
[58] Field of Search ............ 374/130, 131, 159, 161, 374/162; 250/227.14; 505/847

[56] References Cited

U.S. PATENT DOCUMENTS

| | | | |
|---|---|---|---|
| 4,042,673 | 8/1977 | Strong | 423/446 |
| 4,124,690 | 11/1978 | Strong et al. | 423/446 |
| 4,136,566 | 1/1979 | Christensen | 374/161 |
| 4,179,927 | 12/1979 | Saaski et al. | 374/161 X |
| 4,307,607 | 12/1981 | Saaski et al. | 356/44 X |
| 4,790,669 | 12/1988 | Christensen | 374/131 |
| 5,097,133 | 3/1992 | Nam et al. | 250/370.01 |

OTHER PUBLICATIONS

"Diamonds" Gorden Davies *Natural Gemstones* p. 220 (1984).
*Diamond Cutting*, Basil Watermeyer pp. 170–179 (1980).

*Primary Examiner*—William A. Cuchlinski, Jr.
*Assistant Examiner*—Willie Morris Worth
*Attorney, Agent, or Firm*—Scully, Scott, Murphy & Presser

[57] ABSTRACT

A temperature measuring device comprises a light emitter, a nitrogen-containing diamond sensor, a light receiver, and lengths of fibre optics which connect the light emitter and the light receiver to the diamond sensor. The diamond sensor has a base through which the emitted and reflected light pass and sloping surfaces which lead to an apex. The amount of light which is absorbed by the diamond sensor will vary according to the temperature in which the diamond sensor is placed.

2 Claims, 2 Drawing Sheets

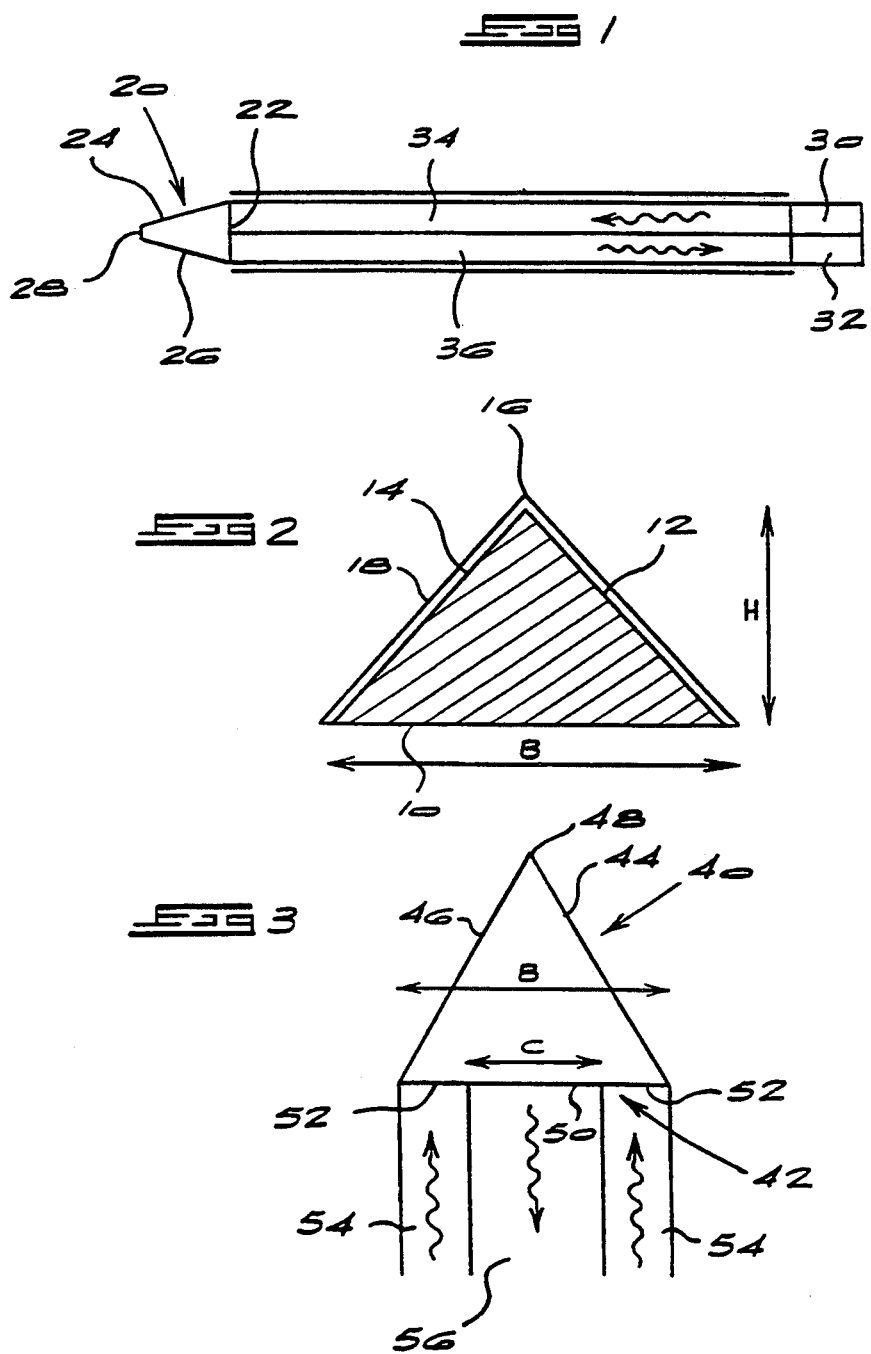

TEMPERATURE MEASURING DEVICE

BACKGROUND OF THE INVENTION

This invention relates to a temperature measuring device.

There are a wide variety of temperature measuring devices such as thermometers, thermistors and the like which are available on the market. There is, however, still a need for a temperature measuring device which can withstand hostile environments and which is sensitive. For example, there is a need for an effective temperature measuring device for electromagnetic fields such as those encountered in transformer cores and in superconductivity applications.

SUMMARY OF THE INVENTION

According to the present invention, there is provided a temperature measuring device including a light emitter, a nitrogen-containing diamond adapted to receive light emitted from the emitter, the diamond being shaped to reflect at least some of the light entering the diamond, and means to receive the reflected light. The amount of light transmitted through the diamond is dependent on the temperature of the diamond. As the temperature is increased above room temperature, the light transmission decreases. Conversely, as the temperature is reduced below room temperature, the light transmission increases.

Thus, the extent of light transmission, or put another way, the extent of light adsorption, is a measure of the temperature of the environment in which the diamond is placed. Similarly, the wavelength of the reflected light will vary according to the temperature of the diamond and so the change in wavelength of the light can also be used as a measure of the temperature of the environment in which the diamond is placed.

Thus, the invention provides according to another aspect, a method of measuring the temperature of an environment which includes the steps of providing a device as described above, placing the diamond in the environment, causing light of a selected wavelength to be emitted by the emitter and to enter the diamond, determining the amount of light entering the diamond, determining the wavelength or the amount of light leaving the diamond and received by the light receiver and comparing the change in wavelength or amount of light with a standard.

DESCRIPTION OF THE DRAWINGS

FIG. 1 is a schematic side view of a temperature measuring device of the invention:

FIG. 2 is a sectional side view of an example of a diamond useful in a temperature measuring device of the invention;

FIG. 3 is a schematic side view of an end of a second embodiment of the invention.

DESCRIPTION OF EMBODIMENTS

Figure 4:
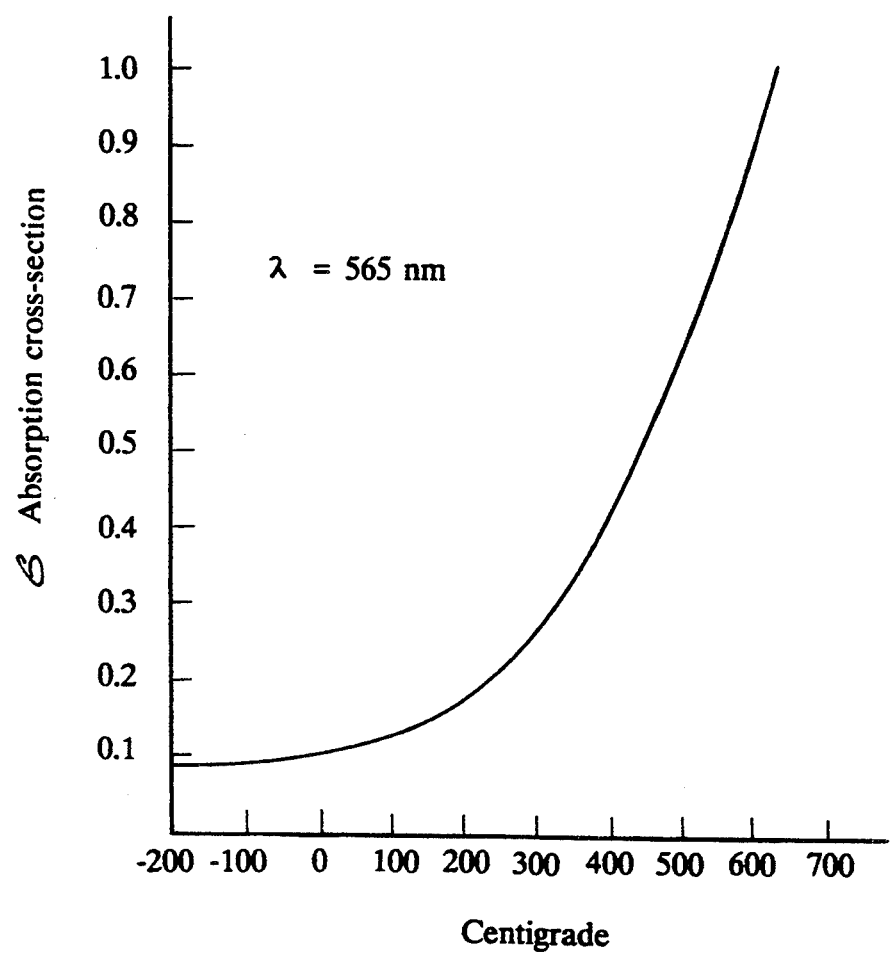
FIG. 4 is a graph which can be used in measuring the temperature of an environment.

The diamond is preferably a synthetic or natural type Ib diamond. Further, the nitrogen concentration of the diamond will typically be in the range 100 ppm to 3000 ppm, preferably about 500 ppm.

The shape of the diamond will preferably be based on the proportional dimensions of a brilliant cut diamond, such that maximum light is internally reflected in the cone. Thus, the cone will preferably have an apex angle of approximately 100°. This may be illustrated with reference to FIG. 2 of the accompanying drawings. Referring to this figure, the diamond has a base 10 through which the emitted and reflected light can pass and sloping surfaces 12, 14 leading from the base to an apex 16 for reflecting a substantial amount of the light entering the diamond. Preferably, the height H of the apex 16 from the base 10 is in the range 40 to 50 percent, preferably 43,2 percent, the largest linear dimension B of the base.

The shape of the diamond may also be hemispherical with the hemispherical surface preferably being shiny. A right-angle prism shape may also be used.

The amount of light which is transmitted from the diamond may be reduced by providing the surfaces of the diamond, other than the surface through which the light passes from the transmitter or to the receiver, with a thin layer of a metal such as platinum, titanium, gold or palladium or a thin layer of silicon carbide or boron nitride. This thin layer will be opaque and is of particular value in corrosive environments. Such a layer, whether it is metal or ceramic, will typically have thickness in the range 50 mm to 500 mm. Referring to the FIG. 2 embodiment, the thin layer 18 is applied to the sloping surfaces 12, 14.

The light emitter may be a light emitting diode or laser beam either of which may emit light of visible wavelength in the range 250 nm and 900 nm.

The receiver will typically be a photodiode, a phototransistor or photomultiplier.

The light from the emitter and the reflected light will preferably pass to and from the diamond along lengths of fibre optic, preferably lengths of bifurcated fibre optic. The bifurcated fibre optic can be randomised or separated. The fibres will typically have a diameter of 5 $\mu$m to 100 $\mu$m, e.g. 60 $\mu$m, and are commercially available and known in the art.

An embodiment of a temperature measuring device of the invention is illustrated schematically by FIG. 1. Referring to this figure, there is shown a type Ib diamond sensor 20 which is essentially cone-shaped having a base 22 and sloping surfaces 24, 26 leading to an apex 28 which is shown as being truncated, although it can also be pointed. The diamond sensor 20 is separated from a light emitter 30 and a light receiver 32 by lengths 34, 36 of bifurcated fibre optic.

In use, light is emitted by the emitter 30 and passes along the lengths 34 of fibre optic and passes into the diamond through the base 22. Some of this light passes through the sloping surfaces 24, 26 and some of the light is internally reflected by the surfaces. The reflected light passes out of the diamond through the base 22 and along the lengths 36 of fibre optic 36 and into the light receiver 32.

The difference in the amount or intensity of light entering the diamond 20 and that leaving the diamond 20 will vary according to the temperature of the diamond. This may be illustrated graphically by FIG. 4. Referring to this figure, it can be seen that the absorption cross-section of the light varies according to the temperature of the diamond which in this case was a Ib diamond (100 ppm N). The higher the absorption cross-section the greater the amount of absorbed light and the lesser the amount of transmitted light. Thus, by determining the difference between the amount of light entering the diamond and that leaving the diamond, i.e.

the absorption cross-section, it is possible to use this graph to determine the temperature of the environment in which that diamond was placed.

The wavelength of the light entering the diamond and that leaving the diamond will also vary according to the temperature of the diamond. Thus, it is possible, in a similar way, to use the change in wavelength to determine the temperature of an environment.

A second embodiment of a temperature measuring device of the invention is illustrated schematically by FIG. 3. Referring to this figure, the diamond sensor 40 has a base 42 and sloping surfaces 44, 46 leading to an apex 48. The base 42 has a central zone 50 and a peripheral zone 52. Light from an emitter (not shown) passes along lengths 54 of fibre optic and enter the diamond through the peripheral zone 52 of the base. The reflected light passes out of the diamond through the central zone 50 and passes along lengths 56 of fibre optic to a light receiver (not shown). Typically, the largest dimension C of the central zone is 50 to 60 percent, typically 57,5 percent, the largest linear dimension B of the base.

The temperature measuring device of the invention may be used to determine the temperature of an environment which may be gaseous, liquid or solid. In the case of solids, the diamond sensor will be brought into contact with a surface of the solid. Because long signal cables to the diamond sensor are not required, the device can be used to measure temperatures in electromagnetic fields such as the temperature of transformer cores, or the temperature in superconductivity applications.

I claim

1. A method of measuring the temperature of an environment, including the steps of shaping a nitrogen-containing synthetic or natural type Ib diamond such that the diamond reflects at least some of the light entering the diamond, placing the nitrogen-containing synthetic or natural type Ib diamond in the environment the temperature of which is being measured, directing light of a selected wavelength emitted by an emitter to enter the diamond, determining the amount of light entering the diamond, receiving the light reflected by and leaving the diamond with a light receiver, determining the wavelength or the amount of light leaving the diamond and received by the light receiver, and comparing the change in wavelength or amount of light with a standard.

2. A method according to claim 1, wherein said step of directing light of a selected wavelength includes directing light having a wavelength in the range of 250 nm to 900 nm.

* * * * *